(12) United States Patent  
Milner et al.

(10) Patent No.: US 9,361,545 B2  
(45) Date of Patent: Jun. 7, 2016

(54) METHODS AND APPARATUS FOR ESTIMATING ANGULAR MOVEMENT WITH A SINGLE TWO DIMENSIONAL DEVICE

(71) Applicant: QUALCOMM Incorporated, San Diego, CA (US)

(72) Inventors: Adrienne Milner, San Diego, CA (US); Kiet Chau, San Diego, CA (US); Victor Hokkiu Chan, Del Mar, CA (US); Michael-David Nakayoshi Canoy, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 152 days.

(21) Appl. No.: 14/295,608

(22) Filed: Jun. 4, 2014

(65) Prior Publication Data

US 2015/0139537 A1    May 21, 2015

Related U.S. Application Data

(60) Provisional application No. 61/905,582, filed on Nov. 18, 2013.

(51) Int. Cl.
| | | |
|---|---|---|
| G06K 9/20 | (2006.01) | |
| G06K 9/40 | (2006.01) | |
| G06K 9/66 | (2006.01) | |
| G06T 7/20 | (2006.01) | |
| G06K 9/46 | (2006.01) | |
| G06N 3/04 | (2006.01) | |

(52) U.S. Cl.
CPC ............... *G06K 9/66* (2013.01); *G06K 9/4604* (2013.01); *G06T 7/2033* (2013.01); *G06K 9/4619* (2013.01); *G06K 9/4671* (2013.01); *G06N 3/049* (2013.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 7,932,925 B2 | 4/2011 | Inbar et al. | |
| 7,977,906 B1 | 7/2011 | Srinivasa et al. | |
| 8,036,425 B2 | 10/2011 | Hou | |
| 8,149,911 B1 * | 4/2012 | Alvarez | G06T 5/003 375/240.12 |
| 8,199,194 B2 * | 6/2012 | Troy | G01S 5/163 348/94 |
| 2007/0291104 A1 | 12/2007 | Petersen et al. | |
| 2008/0262571 A1 * | 10/2008 | Greenberg | A61N 1/36046 607/54 |
| 2012/0086809 A1 | 4/2012 | Lee et al. | |
| 2014/0146201 A1 * | 5/2014 | Knight | H04N 9/04 348/231.99 |

OTHER PUBLICATIONS

M.A. Zerafat Pisheh et al., Detection and Compensation of Image Sequence Jitter Due to an Unstable CCD Camera for Video Tracking of a Moving Target, Proceedings of the 2nd International Symposium on 3D Data Processing, Visualization, and Transmission (3DPVT'04), Published in 2004 by IEEE, 4 pages total.*

(Continued)

*Primary Examiner* — Brian P Werner
(74) *Attorney, Agent, or Firm* — Patterson & Sheridan, LLP

(57) ABSTRACT

Certain aspects of the present disclosure relate to methods and apparatus for neuro-simulation with a single two-dimensional device to track objects. The neuro-simulation may report a point of interest in an image that is provided by the device. The device may center on the point of interest using one or more actuators. The simulation mechanism may input pixels and output a plurality of angles to the actuators to adjust their direction.

19 Claims, 16 Drawing Sheets

(56) References Cited

OTHER PUBLICATIONS

Engbert R, et al., "An Integrated Model of Fixational Eye Movements and Microsaccades", Proceedings of the National Academy of Sciences, vol. 108, No. 39, Sep. 27, 2011, pp. E765-E778, XP855167587, ISSN: 0827-8424, DOI: 10.1073jpnas.1182730188, the whole document.

International Search Report and Written Opinion—PCT/US2014/064289—ISA/EPO—Feb. 13, 2015.

Marti Nez-Conde S, et al., "The Impact of Microsaccades on Vision: Towards a Unified Theory of Saccadic Function", Nature Reviews Neuroscience, vol. 14, No. 2, Jan. 18, 2013, pp. 83-96, XP055167510, ISSN: 1471-003X, DOI: 10.1038jnrn3405, the whole document.

Risinger L, et al., "Motion Detection and Object Tracking with Discrete Leaky Integrate-and-Fire Neurons", Applied Intelligence, The International Journal of Artificial Intelligence, Neural Networks, and Complex Problem-Solving TE, Kluwer Academic Publishers, B0, vol. 29, No. 3, Sep. 19, 2007, pp. 248-262, XP019639014, ISSN: 1573-7497.

Wang P et al., "A Differential Coding-Based Scheduling Framework for Wireless Multimedia Sensor Networks", IEEE Transactions on Multimedia, IEEE Service Center, Piscataway, NJ, US, vol. 15, No. 3, Apr. 1, 2013, pp. 684-697, XP011496893, ISSN: 1520-9210, DOI: 10.1109/TMM.2012.2236304.

\* cited by examiner

METHODS AND APPARATUS FOR ESTIMATING ANGULAR MOVEMENT WITH A SINGLE TWO DIMENSIONAL DEVICE

CROSS-REFERENCE TO RELATED APPLICATIONS

The present application for patent claims priority to U.S. Provisional Application No. 61/905,582, filed Nov. 18, 2013, which is assigned to the assignee of the present application and hereby expressly incorporated by reference herein in its entirety.

TECHNICAL FIELD

The present disclosure relates generally to neural network systems, and more particularly, to estimating angular movement utilizing a single two-dimensional device.

BACKGROUND

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type of artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

SUMMARY

Certain aspects of the present disclosure provide a method for estimating angular movement. The method generally includes receiving an image from a device, selecting a point of interest in the image using an algorithm executed by an artificial nervous system, determining one or more angles and one or more frequencies based at least on the selected point of interest, and outputting a signal to control one or more actuators to adjust a direction of the device based at least on the determined one or more angles and one or more frequencies.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
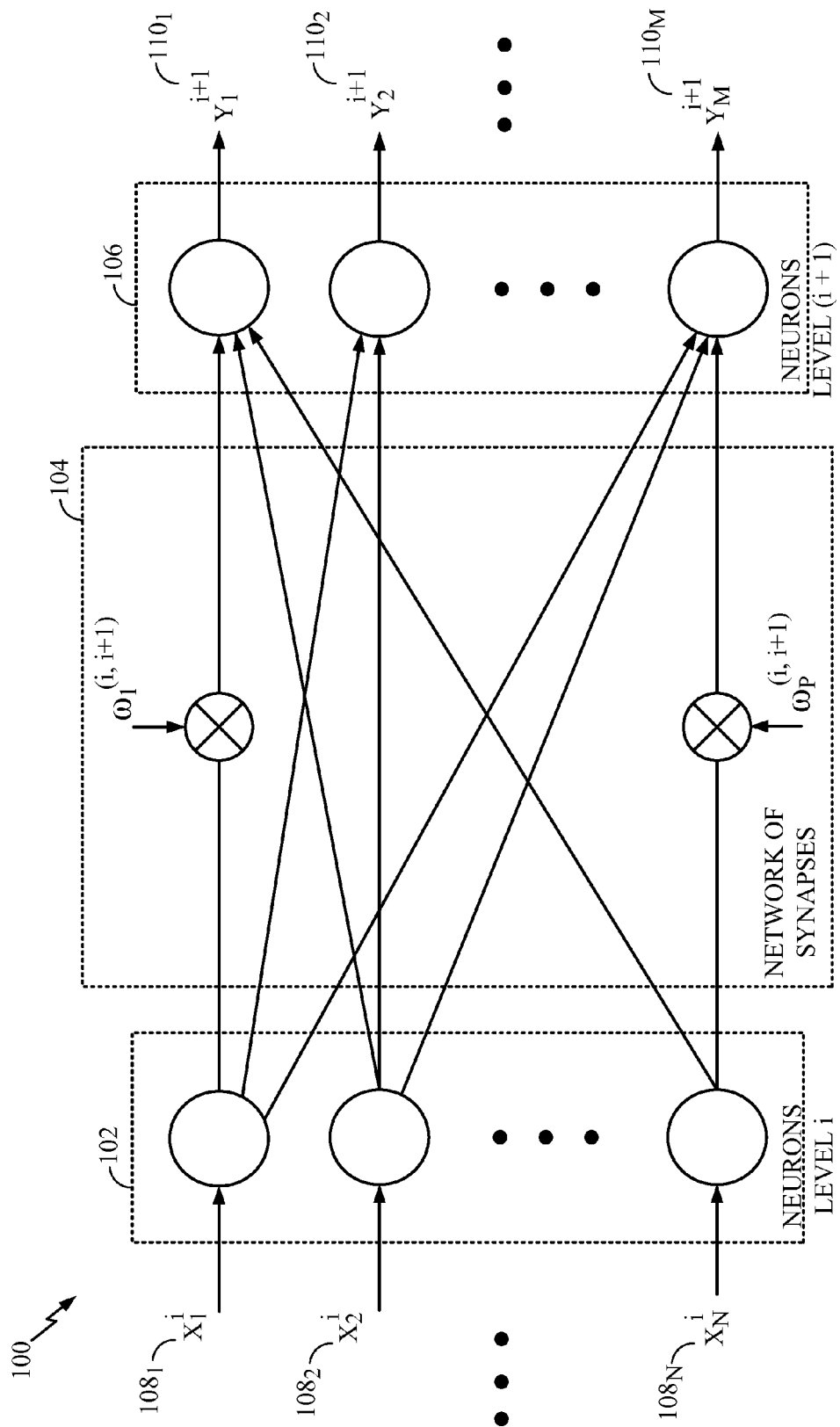
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal is represented only by the frequency and number of spikes, or the time of spikes, not by the amplitude. The information carried by an action potential is determined by the spike, the neuron that spiked, and the time of the spike relative to other spike or spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
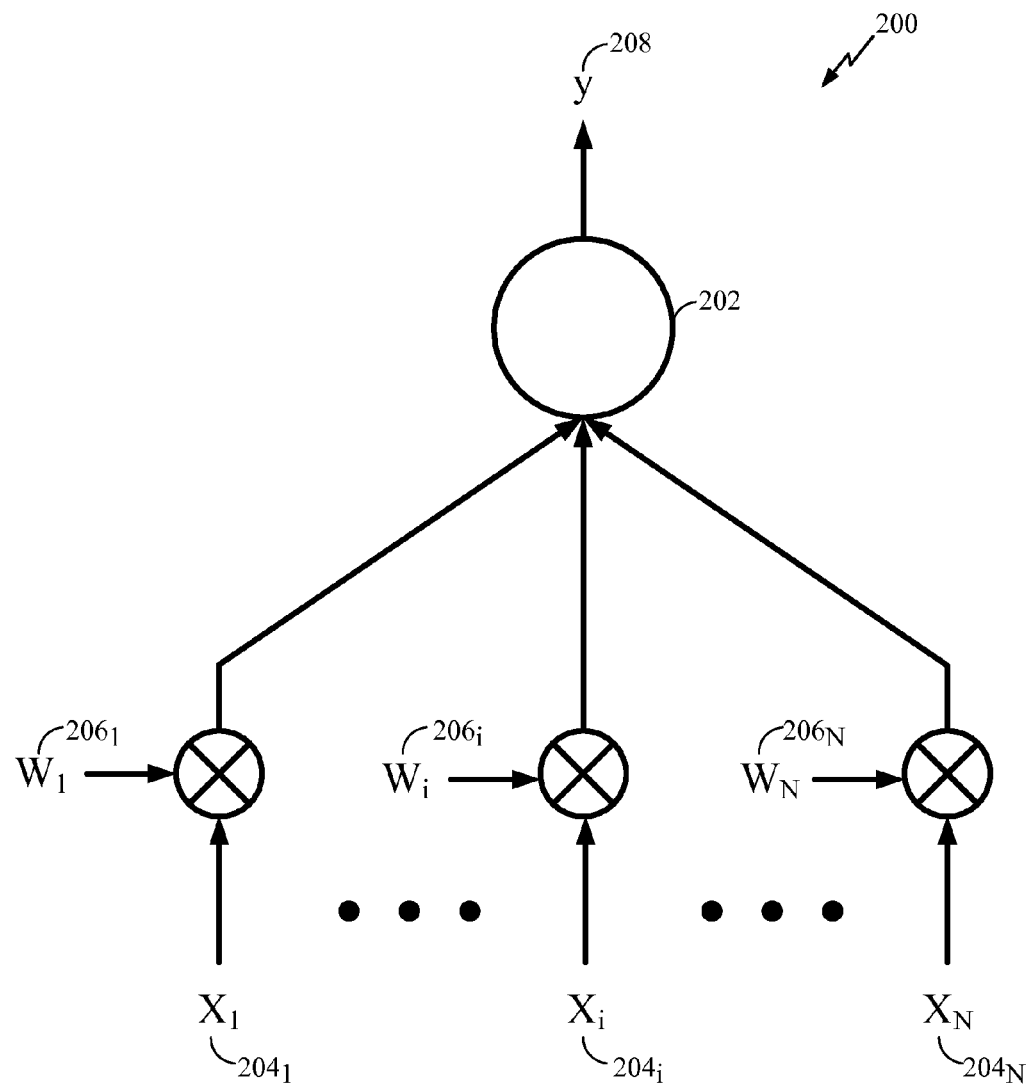
FIG. 2 illustrates example of a processing unit (neuron) of a computational network (neural system or neural network) in accordance with certain aspects of the present disclosure.

FIG. 2 illustrates an example 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by wires with synaptic circuits. The processing unit 202, its input and output connections may also be emulated by a software code. The processing unit 202 may also be emulated by an electric circuit, whereas its input and output connections may be emulated by a software code. In an aspect, the processing unit 202 in the computational network may comprise an analog electrical circuit. In another aspect, the processing unit 202 may comprise a digital electrical circuit. In yet another aspect, the processing unit 202 may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and alike.

During the course of training of neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synapse delay may change only when a weight change occurs or if weights reach zero but not if they are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity". Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period, i.e., being cumulative sufficient to cause the output, the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, t > 0 \\ a_- e^{t/k_-}, t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
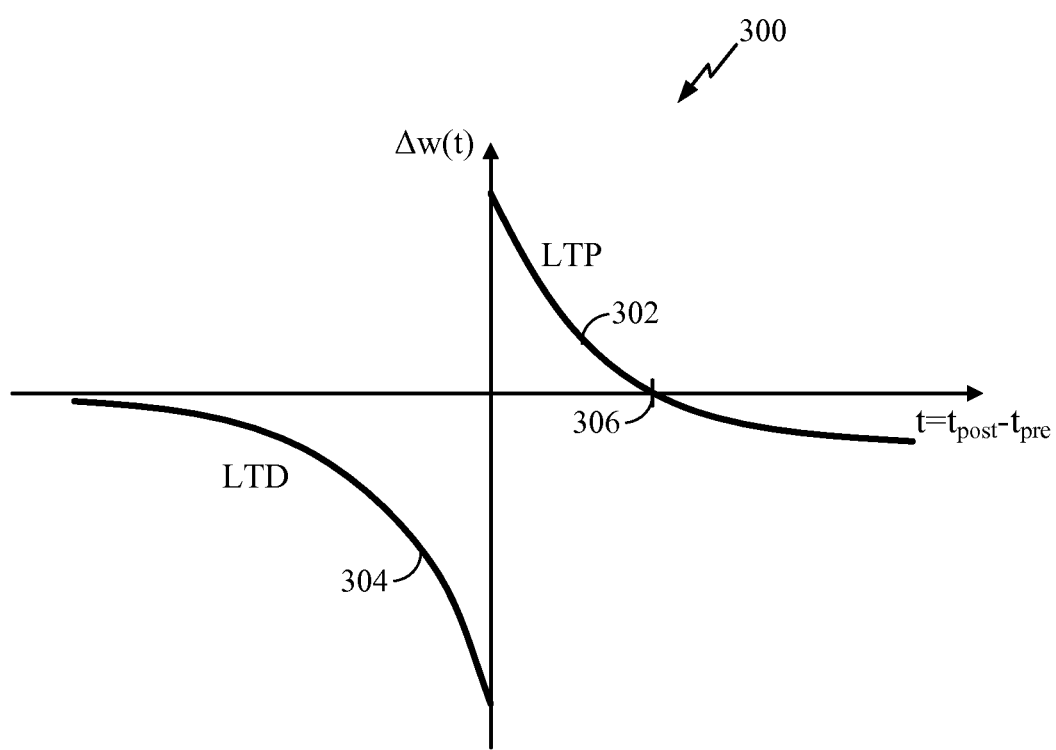
FIG. 3 illustrates an example of spike-timing dependent plasticity (STDP) curve in accordance with certain aspects of the present disclosure.

FIG. 3 illustrates an example graph diagram 300 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input is in the form of a frame of a particular duration comprising spikes or pulses), the offset value µ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset µ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
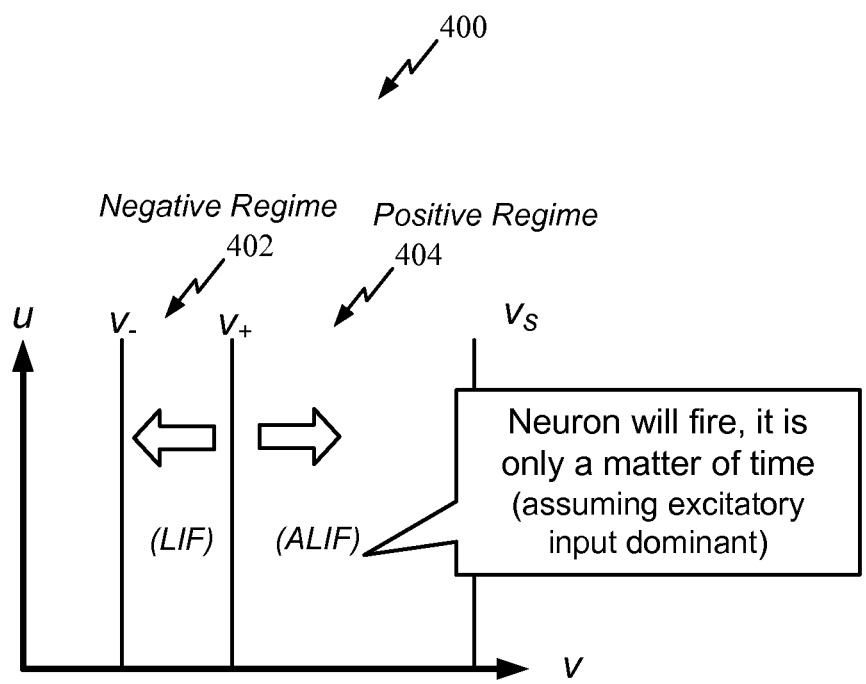
FIG. 4 illustrates an example of a positive regime and a negative regime for defining behavior of a neuron model in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include which is the negative regime time constant, and $\tau_u$ which is the positive regime time constant. The recovery current time constant $\tau_i$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where δ, ε, β and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_p$ and r, respectively. The parameter δ is a scale factor controlling the slope of the u null-cline. The parameter ε is typically set equal to $-v_-$. The parameter β is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and Δu are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{\frac{\Delta t}{\tau_u}} - r \quad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \dfrac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one comprised of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Exemplary Methods and Apparatus for Estimating Angular Movement with a Single Two Dimensional Device Certain aspects of the present disclosure provide a method for neuro-simulation with a single two-dimensional device to track objects. The neuro-simulation may report a point of interest in an image that is provided by the device. The device may center on the point of interest using one or more actuators. The simulation mechanism may input pixels and output a plurality of angles to the actuators to adjust their direction. Therefore, techniques are needed to estimate angle and frequency of movements for the actuators.

Certain aspects provide a plurality of methods to overcome problem of signal attenuation in sensors (or sensor processing) or to provide signal persistence. This may be particularly relevant when the sensor uses differential coding such that only signal differences (based on time or space) are sent to its receivers. Rapid sensor movements (e.g., an image capturing device such as a camera) may ensure that a picture does not disappear in the sensor because of signal attenuation. Certain aspects may convert x and/or y coordinates of an object in an image to one or more angles for movement through one or more actuators. For certain aspects, micro-movements may be applied by oscillation or noise in the actuators. In addition, macro-movements may be applied through a control mechanism. For certain aspects, the problem of attenuation in sensors may also be solved through software jitter of the input signal.

While certain examples are provide that refer to visual sensor processing (e.g., from an array of sensors of a camera), more generally, the techniques presented herein may be applied to any type of sensor system, particularly those that can be mapped to two dimensions (2D) or more. For example, a 2D array of temperature sensors may be used (e.g., in addition to or in place of a camera) and the system could accurately control its motion relative to the temperature being sensed (e.g., with motion controlled by a heat map rather than visual camera data). Of course the techniques may be applied using other types of arrays, such as microphone arrays.

Figure 5:
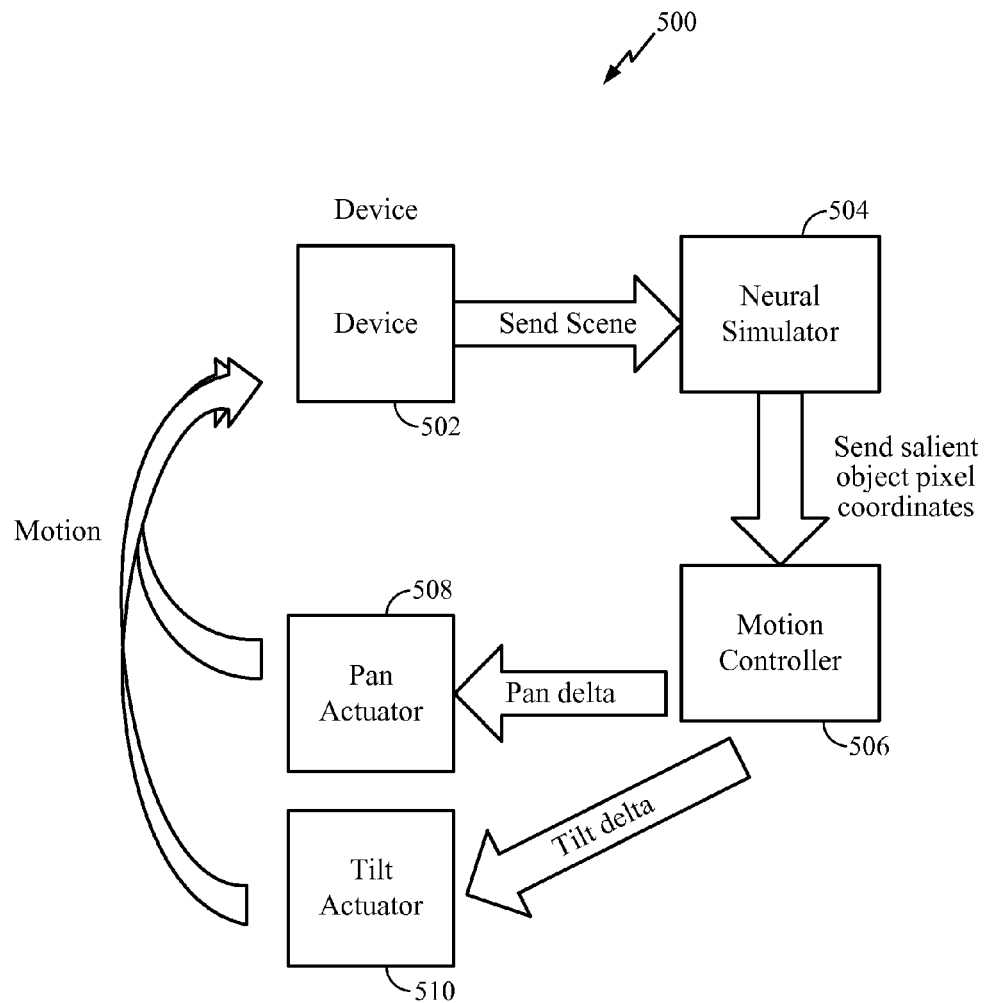
FIG. 5 illustrates a high-level block diagram of a system for estimating angular movement, in accordance with certain aspects of the present disclosure.

FIG. 5 illustrates a high-level block diagram of the proposed system for estimating angular movement of a device, in accordance with certain aspects of the present disclosure. The device 502 may capture an image and send the image to a neural simulator 504. The Neural simulator may find a point of interest in the image (e.g., a salient object) and send pixel coordinates of the point of interest to a motion controller 506. The motion controller 506 may encode the information, and may generate differential pan and tilt values that can be fed to a pan actuator 508 and a tilt actuator 510, respectively. The pan/tilt actuators may then change orientation of the device based on the received differential pan and/or tilt values.

The differential pan and/or tilt values may capture the difference between the current pan and/or tilt values compared to desired pan and/or tilt values (e.g., using differential coding). It should be noted that by sending the differential values, orientation of the device may be adjusted and/or adapted with less data compared to a case in which absolute pan and/or tilt values are sent. In the example illustrated in FIG. 5, the device may center on a moving object through continual mechanical movements in a closed loop system.

Certain aspects provide techniques for constructing small movements in a sensor to prevent attenuation based on a single visual source input. Techniques are presented for converting a two-dimensional point of interest (e.g., a salient point) into physical movements of the sensor. This may result in constant stimulation of the neural model. Moreover, magnitude and frequency of movements may be determined based on the region of the field (e.g., point of interest or region of interest) in the image.

Figure 6:
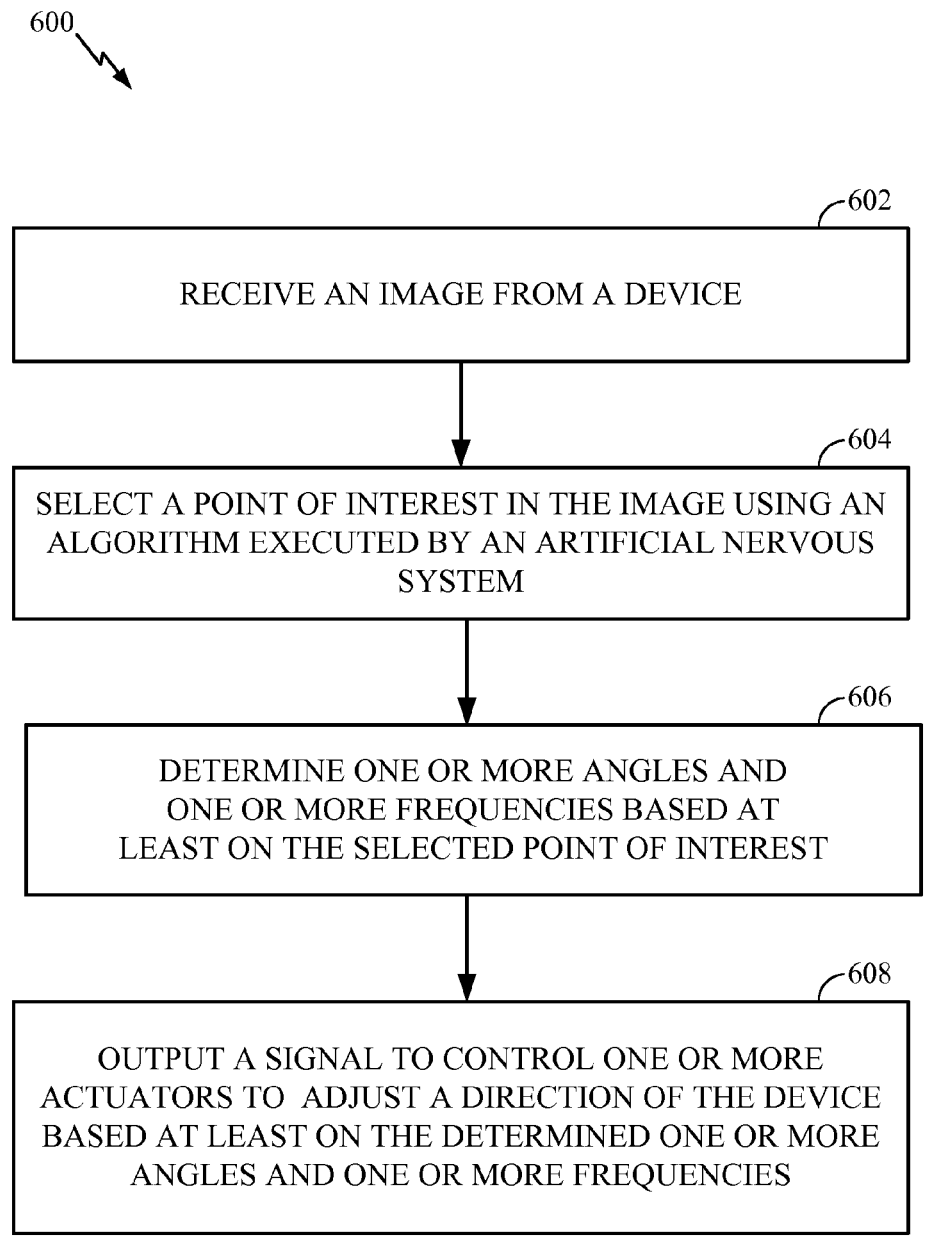
FIG. 6 illustrates example operations for estimating angular movement, in accordance with certain aspects of the present disclosure.

FIG. 6 illustrates example operations that may be performed by a system to estimate angular movement of a device, in accordance with certain aspects of the present disclosure. At 602, an image may be received from a device (e.g., a camera). At 604, a point of interest (e.g., a salient object) may be selected in the image using an algorithm executed by an artificial nervous system. At 606, one or more angles and/or one or more frequencies for the adjustment may be determined based at least on the selected point of interest or the decay time constant of the sensor encoding scheme. At 608, a signal may be outputted to control one or more actuators to adjust a direction of the device based at least on the determined one or more angles and one or more frequencies.

For certain aspects, different methods may be used for noise injection (e.g., micro-movements) in the device. For example, by using mechanical shaking and/or un-tuned PID (proportional-integral-derivative) loop, random noise may be injected in the system which may result in micro-movements in the actuators. In another aspect, random number of pixels may be used to offset the image at random intervals.

Figure 7:
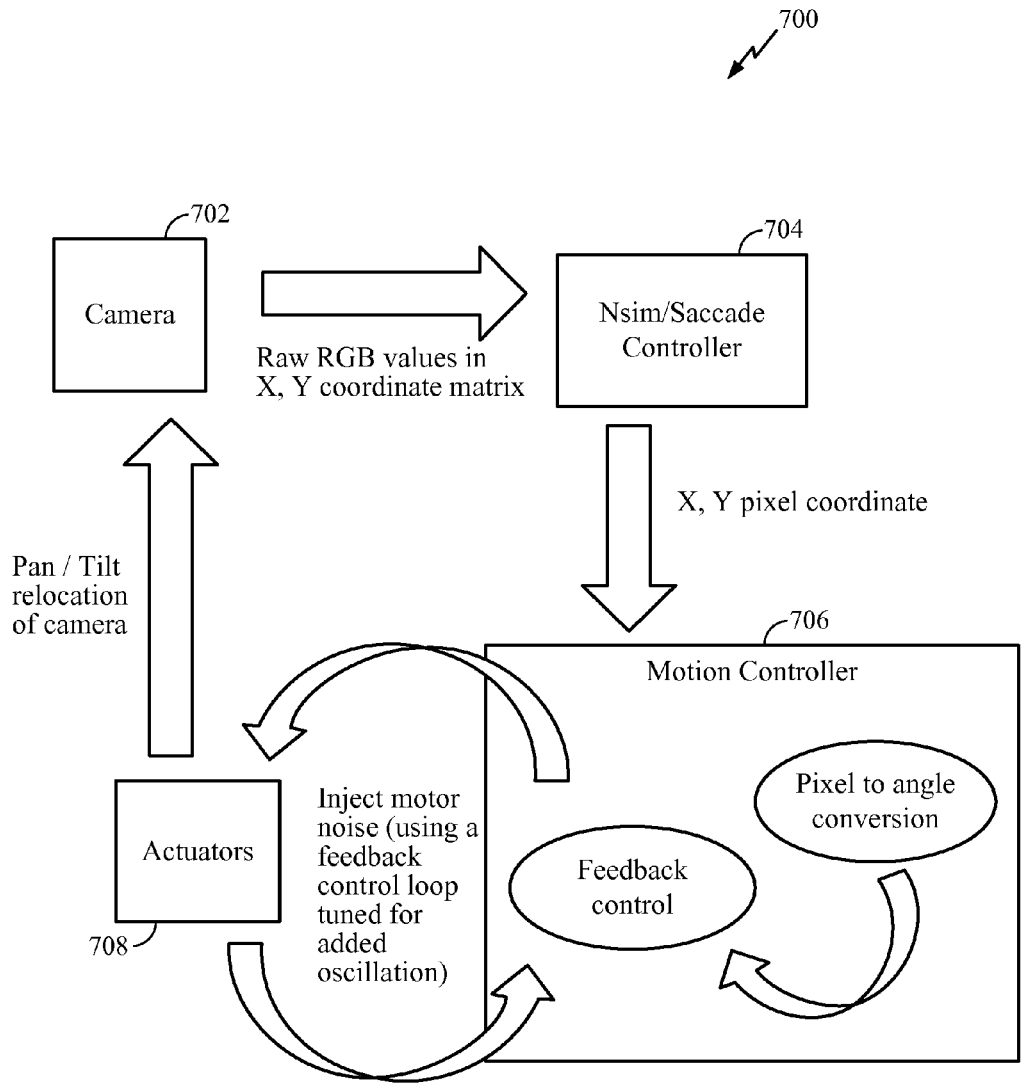
FIG. 7 illustrates an example implemented system (e.g., DUG) for estimating angular movement, in accordance with certain aspects of the present disclosure.

For certain aspects, static methods may be used based on a formula for noise injection and/or micro-movements. For example, frequency and amplitude of movement may be considered to be proportional to a desired spike rate. In another aspect, dynamic methods based on feedback may be used for noise injection and/or micro-movements. For example, a spike rate may be calculated in the system based on one or more parameters. The spike rate may then be fed to a micro-movement module or to the actuators. As a result, frequency and/or amplitude of the movement may be increased or decreased to increase or decrease the spike rate. In another example, the magnitude of the micro-movements may be computed based on the pitch size of the sensor such that the minimum spatial displacement should be greater than the pitch size which is defined as the minimum distance between the center of any two sensing units. FIG. 7 illustrates an example implemented system for estimating angular movement of a camera, in accordance with certain aspects of the present disclosure. As illustrated, a camera 702 may generate raw RGB (red, green, blue) values and store them in a matrix (e.g., X-Y coordinate matrix). A neural simulator/saccade controller 704 may generate X and/or Y coordinates of a point of interest and send the coordinates to a motion controller 706. The motion controller may perform pixel to angle conversion based on the proposed method and generate feedback data to be sent to the actuators. As an example, the motion controller may inject motor noise using a feedback control loop tuned for added oscillation, and/or any other method. The actuators 708 may change pan and/or tilt orientation of the camera based on the feedback data.

Figure 8:
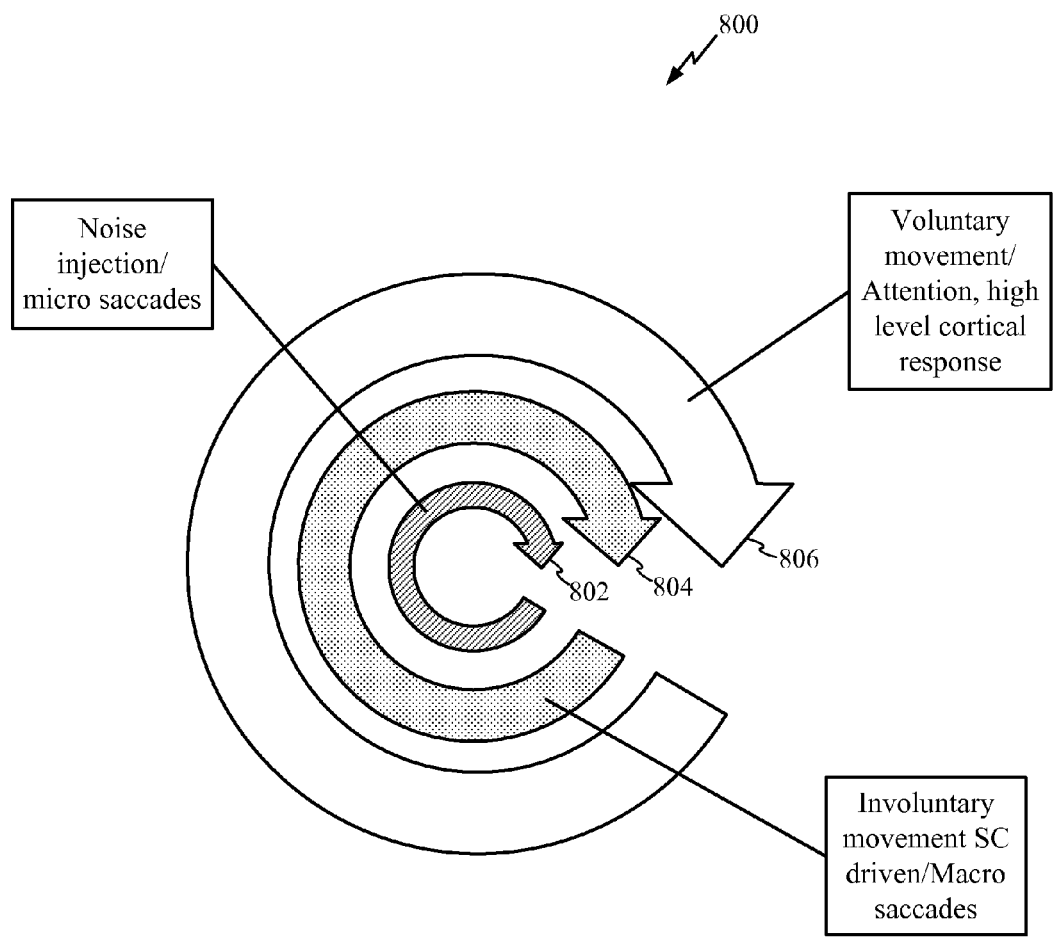
FIG. 8 illustrates example levels of movement, in accordance with certain aspects of the present disclosure.

FIG. 8 illustrates example levels of motion, in accordance with certain aspects of the present disclosure. As an example, motion in the eyes is described. For example, the motion may be very small (e.g., noise injection/micro-saccades 802). In addition, there might be some involuntary movement driven/macro-saccades 804. In addition, the movements may be voluntary based on attention and high-level cortical response 806.

Figure 9:
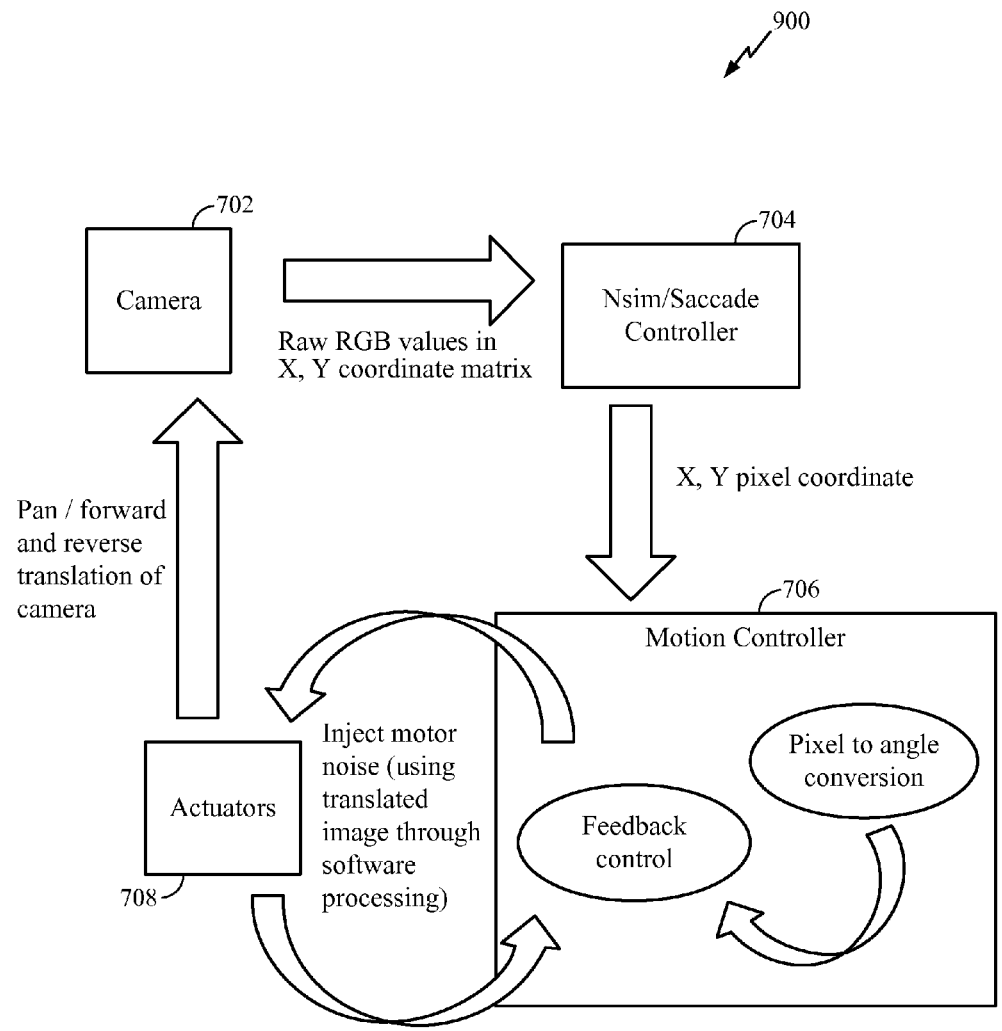
FIG. 9 illustrates another example implemented system for estimating angular movement (e.g., Dug on Wheels (DUWG)), in accordance with certain aspects of the present disclosure.

FIG. 9 illustrates another example implemented system for estimating angular movement of a device in accordance with certain aspects of the present disclosure. Similar to FIG. 7, the camera 702 may generate raw RGB values in an X-Y coordinate matrix. The neural simulator/saccade controller 704 may generate X and Y coordinates of a point of interest and send the coordinates to the motion controller 706. The motion controller may perform pixel to angle conversion and generate feedback data to be sent to the actuators. In this example, the motion controller may inject motor noise by using translated image through software processing. It should be noted that any other noise-injection method may also be used. The actuators 708 may change pan and/or tilt orientation of the camera based on the feedback data.

For certain aspects, there may be a link between time-step of the simulation and frequency of jitter in the system. It should be noted that the preferred frequency of jitter may be determined based on the parameters of the system. For example, adding too much jitter in the system may waste resources, and may add too much noise to the system. On the other hand, if frequency of jitter is too low, the system may experience attenuation. For certain aspects, frequency of jitter may be adjusted based on type of feature detection that is accomplished in the system.

Figure 10:
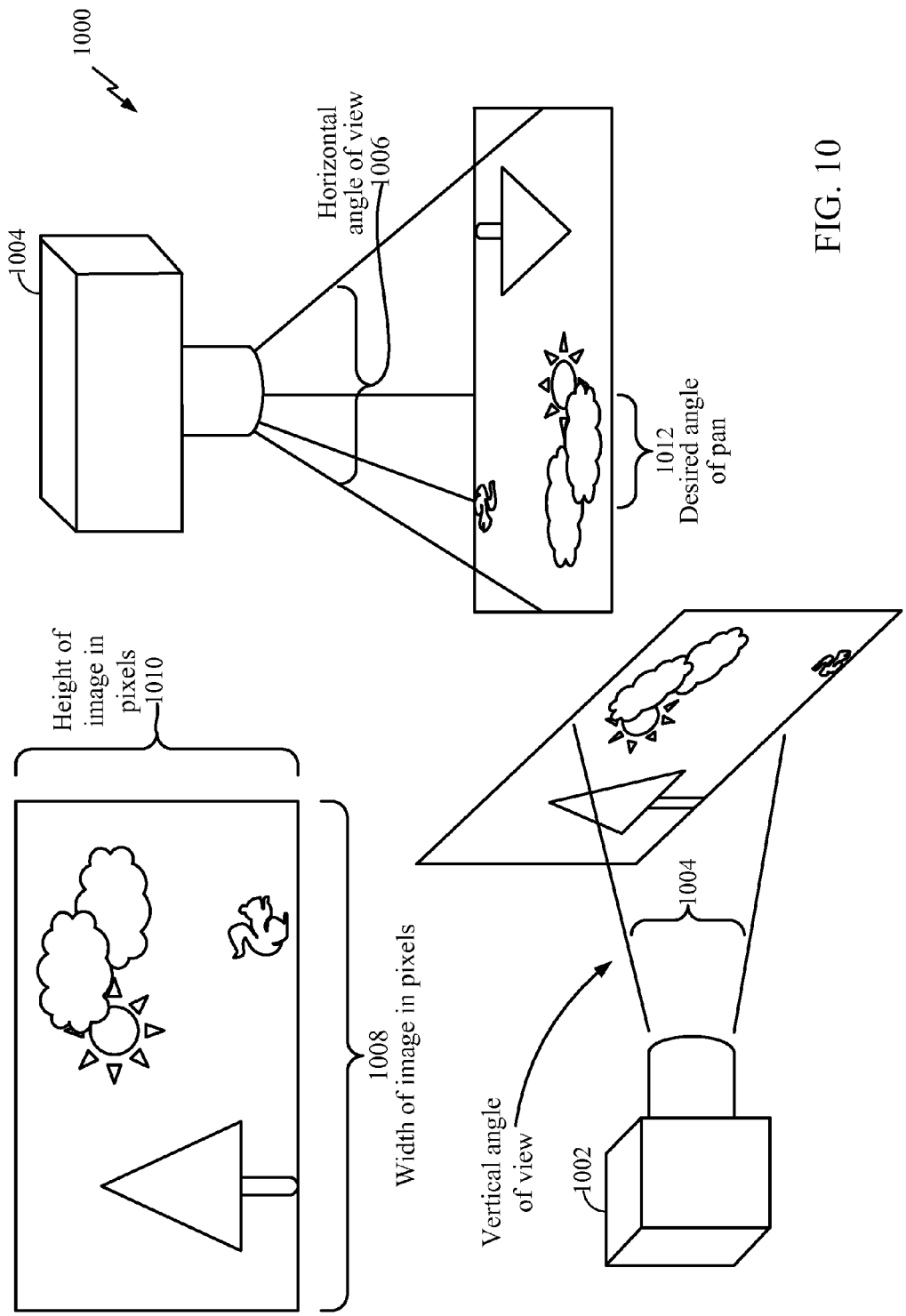
FIG. 10 illustrates example parameters that may be used for estimating angular movement, in accordance with certain aspects of the present disclosure.

FIG. 10 illustrates example parameters that may be used for estimating angular movement of a camera, in accordance with certain aspects of the present disclosure. For example, a camera 1004 may capture an image with height 1010 and width 1008 in pixels. For certain aspects, the desired pan angle p 1012, and the desired tilt angle (e.g., t) of the camera may be calculated as follows:

$$p = X * a/w, \quad (15)$$

$$t = \beta/h, \text{ and}$$

$$p/a = X/w$$

where a represents the horizontal angle of view 1006 of the camera lens, w represents width of the image in pixels, $\beta$ represents the vertical angle of view 1004 of the camera lens, and h represents height of the image in pixels, and X represents horizontal coordinate of a new pixel.

Figure 11:
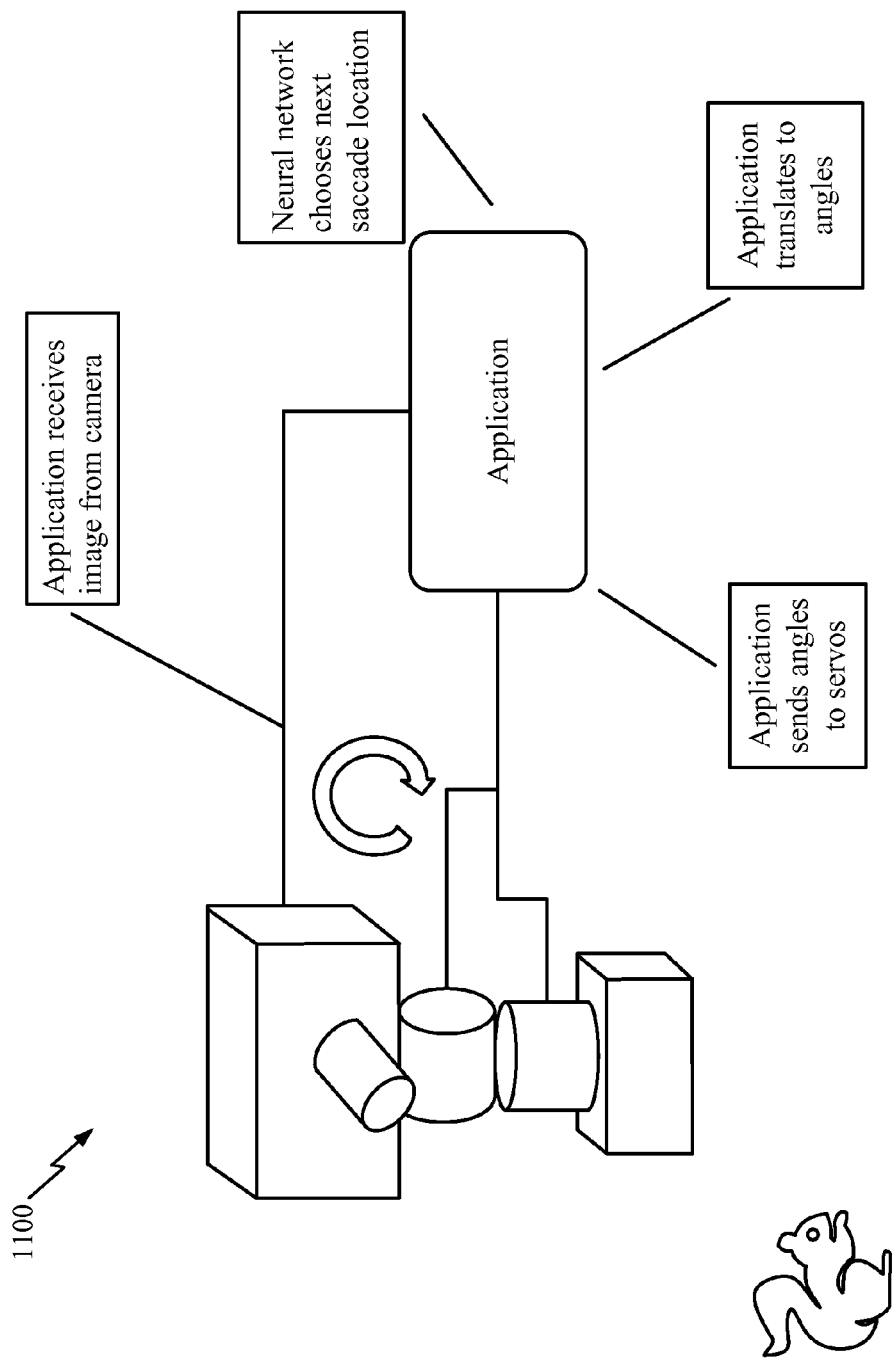
FIG. 11 illustrates an example high-level block diagram of the proposed method, in accordance with certain aspects of the present disclosure.

FIG. 11 illustrates an example high-level block diagram of the proposed method, in accordance with certain aspects of the present disclosure. As illustrated, a camera may capture an image and send the image to an application. The application may run a neural network algorithm to choose a point of interest in the image. The application may then translate the coordinates of the point of interest into angles and send the angles to one or more actuators to adjust orientation of the camera.

Figure 12:
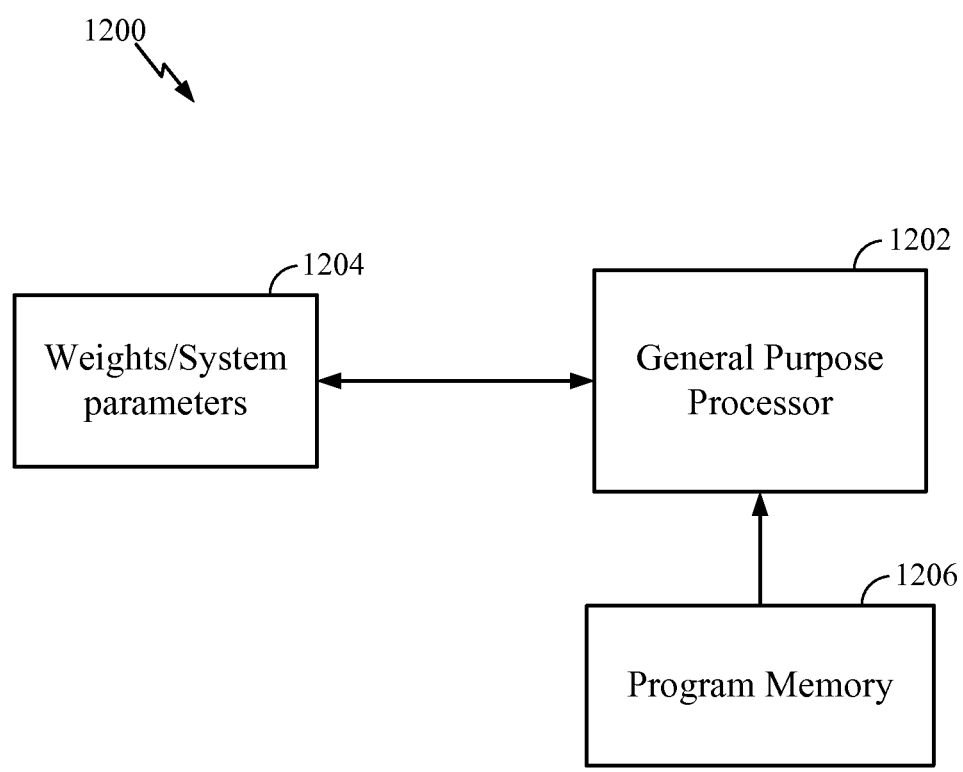
FIG. 12 illustrates an example implementation of designing a neural network for estimating angular movements using a general-purpose processor in accordance with certain aspects of the present disclosure.

FIG. 12 illustrates an example implementation 1200 of the aforementioned neural network model for estimating angular movement using a general-purpose processor 1202 in accordance with certain aspects of the present disclosure. Variables (neural signals), synaptic weights and system parameters associated with a computational network (neural network) may be stored in a memory block 1204, while instructions executed at the general-purpose processor 1202 may be loaded from a program memory 1206. In an aspect of the present disclosure, the instructions loaded into the general-purpose processor 1202 may comprise code for receiving an image from a device, code for selecting a point of interest in the image using an algorithm executed by an artificial nervous system, code for determining one or more angles and one or more frequencies, and one or more magnitudes based at least on the selected point of interest, and code for outputting a signal to control one or more actuators to adjust a direction of the device based at least on the determined one or more angles and one or more frequencies and one or more magnitudes.

Figure 13:
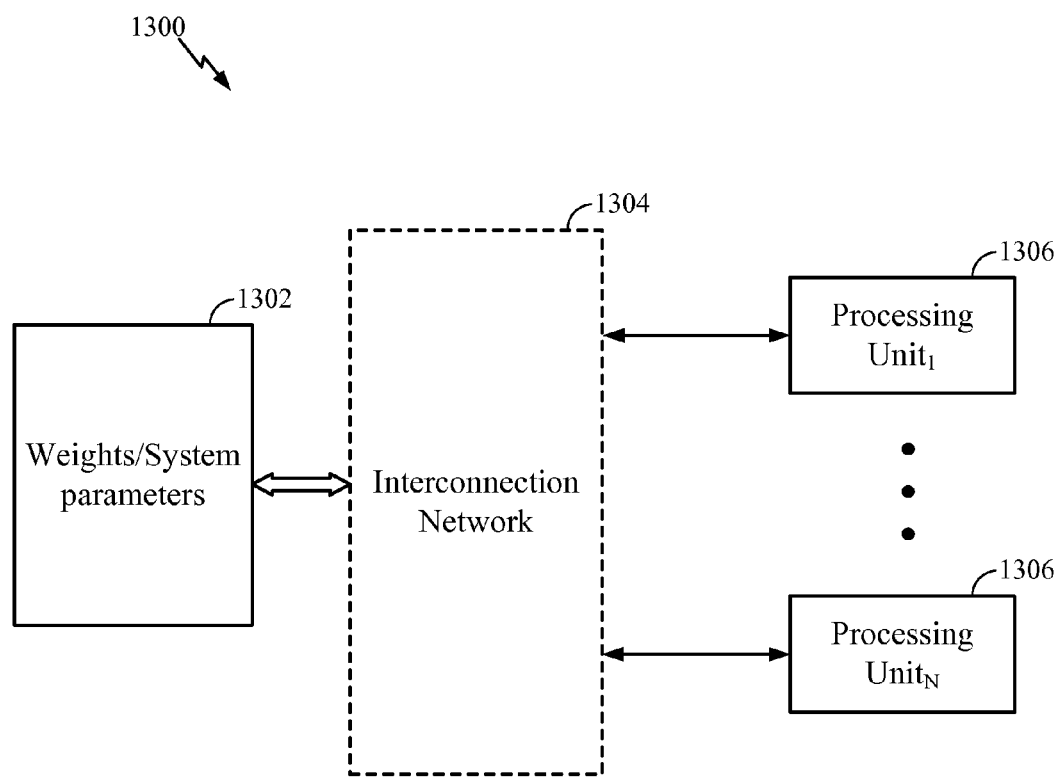
FIG. 13 illustrates an example implementation of designing a neural network for estimating angular movements where a memory may be interfaced with individual distributed processing units in accordance with certain aspects of the present disclosure.

FIG. 13 illustrates an example implementation 1300 of the aforementioned method for estimating angular movement where a memory 1302 can be interfaced via an interconnection network 1304 with individual (distributed) processing units (neural processors) 1306 of a computational network (neural network) in accordance with certain aspects of the present disclosure. Variables (neural signals), synaptic weights and system parameters associated with the computational network (neural network) may be stored in the memory 1302, and may be loaded from the memory 1302 via connection(s) of the interconnection network 1304 into each processing unit (neural processor) 1306. In an aspect of the present disclosure, the processing unit 1306 may be configured to receive an image from a device, select a point of interest in the image using an algorithm executed by an artificial nervous system, determine one or more angles and one or more frequencies and one or more magnitudes based at least on the selected point of interest, and output a signal to control one or more actuators to adjust a direction of the device based at least on the determined one or more angles and one or more frequencies and one or more magnitudes.

Figure 14:
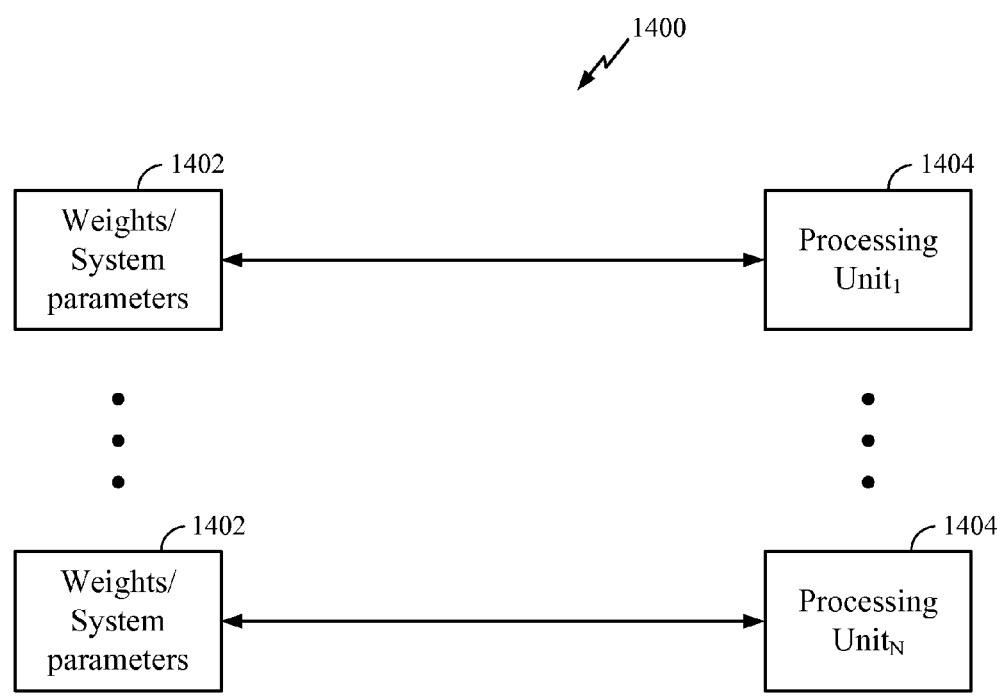
FIG. 14 illustrates an example implementation of designing a neural network for estimating angular movements based on distributed memories and distributed processing units in accordance with certain aspects of the present disclosure.

FIG. 14 illustrates an example implementation 1400 of the aforementioned method for estimating angular movement based on distributed weight memories 1402 and distributed processing units (neural processors) 1404 in accordance with certain aspects of the present disclosure. As illustrated in FIG. 14, one memory bank 1402 may be directly interfaced with one processing unit 1404 of a computational network (neural network), wherein that memory bank 1402 may store variables (neural signals), synaptic weights and system parameters associated with that processing unit (neural processor) 1404. In an aspect of the present disclosure, the processing unit 1404 may be configured to receive an image from a device, select a point of interest in the image using an algorithm executed by an artificial nervous system, determine one or more angles and one or more frequencies and one or more magnitudes based at least on the selected point of interest, and output a signal to control one or more actuators to adjust a direction of the device based at least on the determined one or more angles and one or more frequencies and one or more magnitudes.

Figure 15:
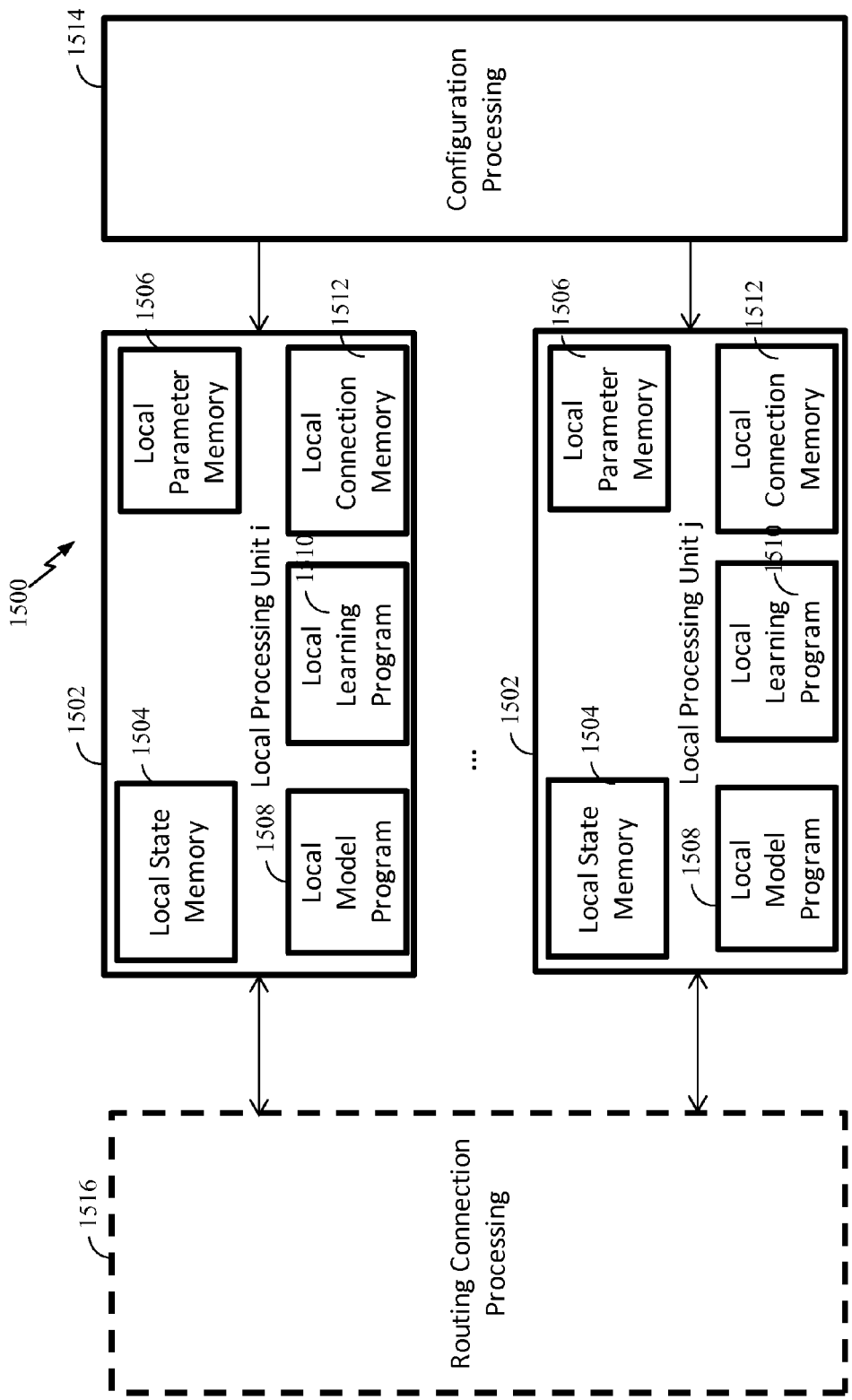
FIG. 15 illustrates an example implementation of a neural network in accordance with certain aspects of the present disclosure.

FIG. 15 illustrates an example implementation of a neural network 1500 in accordance with certain aspects of the present disclosure. As illustrated in FIG. 15, the neural network 1500 may comprise a plurality of local processing units 1502 that may perform various operations of methods described above. Each processing unit 1502 may comprise a local state memory 1504 and a local parameter memory 1506 that store parameters of the neural network. In addition, the processing unit 1502 may comprise a memory 1508 with local (neuron) model program, a memory 1510 with local learning program, and a local connection memory 1512. Furthermore, as illustrated in FIG. 15, each local processing unit 1502 may be interfaced with a unit 1514 for configuration processing that may provide configuration for local memories of the local processing unit, and with routing connection processing elements 1516 that provide routing between the local processing units 1502.

According to certain aspects of the present disclosure, the operations 600 illustrated in FIG. 6 may be performed in hardware, e.g., by one or more processing units 1502 from FIG. 15.

Although most of the examples as described in the present disclosure use a camera as an image-capturing device, one skilled in the art would appreciate that the teachings herein may readily be applied to one-dimensional sensors (e.g., a microphone) or sensors capturing higher dimensions of data, all of which fall in the scope of the present disclosure.

Figure 6A:
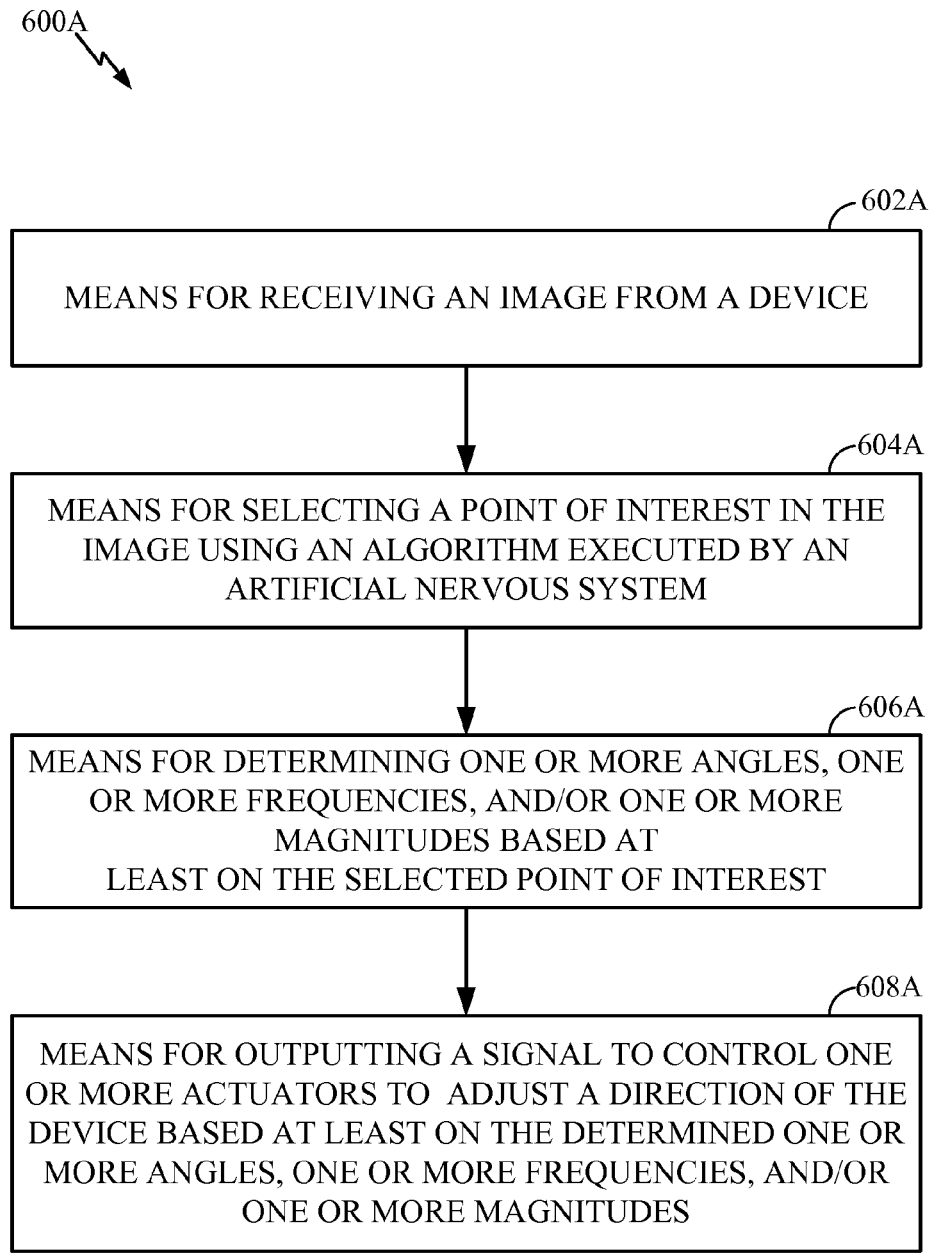
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in Figures, those operations may have corresponding counterpart means-plus-function components with similar numbering. For example, operations 600 illustrated in FIG. 6 correspond to components 600A illustrated in FIG. 6A. As an example, means for receiving, means for selecting, means for determining and/or means for adjusting may be a processing element, such as a general purpose processor or a special purpose processor such as a digital signal processor (DSP), ASIC or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. For example, means for identifying, means for determining, means for inferring and means for updating may be any suitable processing element such as a processor or the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   processing images obtained from at least one sensor device;
   selecting points of interest in the images relative to current points of interest; and providing persistence to the signal by introducing jitter such that the images are altered based on the selected points to enhance processing of the images.

2. The method of claim 1, wherein:
   the images comprise visual images obtained from a camera; and
   the jitter simulates rapid movement of an eye.

3. The method of claim 2, wherein the camera generates sensor output utilizing differential encoding and the jitter creates persistence in the otherwise attenuating sensor output.

4. The method of claim 1, wherein the images are processed by an artificial nervous system.

5. The method of claim 4, wherein the jitter is dynamically adjusted based, at least in part, on spiking events in the artificial nervous system.

6. The method of claim 5, wherein at least one of a frequency or magnitude of the jitter is adjusted if the spiking activity falls below a threshold amount.

7. The method of claim 3, wherein introducing jitter comprises:
   determining one or more angles based on the selected points; and
   altering the images based at least on the determined one or more angles.

8. The method of claim 7, wherein the one or more angles comprise at least one pan angle p and at least one tilt angle t, wherein p is determined as follows:

$$p = X * a / w$$

in which a represents horizontal angle of view of the sensing device and w represents width of an image in pixels, X represents horizontal coordinate of image and t is determined as follows:

$$t = \beta / h$$

in which β represents vertical angle of view of the device and h represents height of the image in pixels.

9. The method of claim 1, wherein introducing the jitter comprises taking action to physically move the sensing device.

10. The method of claim 1, wherein introducing the jitter comprises manipulating the images obtained from the sensor device via software processing.

11. The method of claim 1, wherein at least one feature of the jitter is adjusted dynamically.

12. The method of claim 10, wherein at least one feature of the jitter is adjusted based, at least in part, on a size of a sensed field of the images.

13. The method of claim 12, wherein at least a rate or magnitude of the jitter is adjusted based, at least in part, on the size of a sensed field of the images.

14. The method of claim 12, wherein at least a rate of the jitter is adjusted based, at least in part, on at least one of the decay time constant of the sensor or sensor encoding scheme.

15. The method of claim 12, wherein at least a magnitude of the jitter is adjusted based, at least in part, on a pitch size of the sensor, where the pitch size is defined as a minimum distance between a center of individual sensing units.

16. The method of claim 1, wherein a rate of the jitter is determined based, at least in part, on a sampling rate used to obtain the images from the sensor device.

17. The method of claim 1, wherein:
the images comprise audio images obtained from a microphone; and
introducing jitter by altering the images comprises shifting the audible images in at least one of time or frequency.

18. The method of claim 1, wherein the at least one sensor comprises an array of sensors.

19. The method of claim 18, wherein the array of sensors comprises an array of temperature sensors.

* * * * *